United States Patent [19]
Lynch et al.

[11] 3,916,553
[45] Nov. 4, 1975

[54] DECOY

[76] Inventors: Howard M. Lynch, 2810 Halcyon Ave., Baltimore, Md. 21214; Thomas L. Thomas, 424 Drew St., Baltimore, Md. 21224

[22] Filed: Feb. 1, 1974

[21] Appl. No.: 438,678

[52] U.S. Cl. ............................................. 43/3
[51] Int. Cl.² ................................. A01M 31/06
[58] Field of Search ............................... 43/3

[56] References Cited
UNITED STATES PATENTS

| | | | |
|---|---|---|---|
| 2,460,128 | 1/1949 | Greenleaf | 43/3 |
| 2,799,960 | 7/1957 | Riley | 43/3 |
| 3,350,808 | 11/1967 | Mitchell | 43/3 |

Primary Examiner—Louis G. Mancene
Assistant Examiner—Daniel J. Leach
Attorney, Agent, or Firm—J. Wesley Everett

[57] ABSTRACT

A wild fowl decoy wherein the fowl is presented in a life-like pose having a self-contained mechanism to give to the decoy a natural pecking action which is operated by a battery-powered motor adapted to operate a cam having a cam follower which will give a particular motion to the neck and head of the decoy to imitate a fowl when feeding.

3 Claims, 3 Drawing Figures

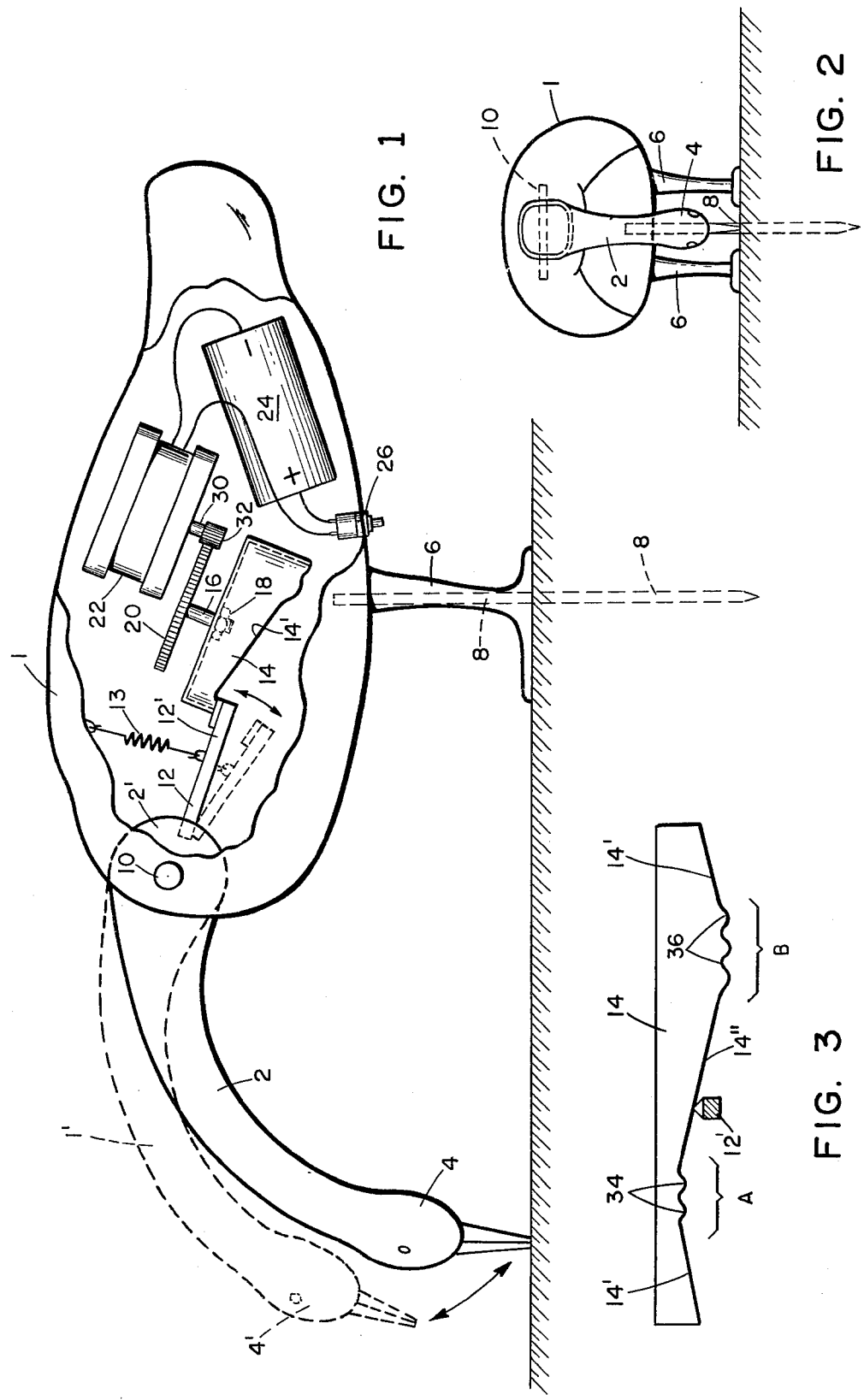

DECOY

The present invention relates to decoys and in particular to decoys for attracting geese and other wild fowl.

One object of the invention is to provide a simple and practical operating mechanism for moving the neck and head of the decoy in a way that is familar to wild fowl sought to be decoyed.

Another object of the invention is to provide a mechanism that is self-contained within the decoy.

A further object of the invention is to provide a mechanism that is substantially without any operating noises.

While several objects have been set forth, other objects, uses and advantages will become apparent as the nature of the invention is more fully disclosed in the following description with reference to the accompanying drawings in which:

FIG. 1 is an elevational view of the decoy having parts broken away in order to illustrate the operating mechanism.

FIG. 2 is a front elevational view.

FIG. 3 is a view in elevation of the cam member developed into a single plane.

Referring in detail to the decoy, there is provided a stationary body portion 1 which in this instance represents a goose. Pivotedly affixed to the front end of the decoy upon a pin 10 is a neck member 2 including a head portion 4. The body portion 1 may be supported upon a leg and foot-like member 6, and the decoy may be held in its selected position by a stake 8. The body may be constructed from any suitable material such as plastic, papier mache, metal, wood, etc.

The neck and head portion of the decoy is hinged to the body on the pin 10 in order that the neck and head may be moved to simulate a feeding motion that would convey to the wild fowl a natural eating position.

It will be noted in FIG. 1 that the travel of the neck and head is somewhat limited and is in the natural feeding motion of a goose. Should the neck and head be raised to an extended outward or raised position it would indicate to the wild fowl that the decoy sensed some kind of danger. It may be noted that these wild fowl are very sensitive to signs of danger and any extension of the neck and head of a feeding goose is an indication of danger; therefore, it is important that the decoy be operated to simulate as near as possible the natural action of the fowl when eating.

To simulate this particular feeding motion, the end 2' of the neck 2 on the opposite side of the pin 10 is provided with means for raising and lowering the neck and head portions 2 and 4. Rigidly fixed to the neck portion 2 is a stem 12. Positioned over the outer end 12' of the stem is a cam member 14. This cam member is rigidly secured to a shaft 16 by a suitable nut 18 in order that the cam may be replaced, or a cam of a different contour may be secured to the shaft 16 in case it is desired to give the neck and head a slightly different motion. On the shaft 16 there is provided a gear wheel 20. The gear wheel 20 is rotated by a suitable motor 22 which in turn is operated by an appropriate battery carried in the container 24. The electric current from the battery is controlled by an electric switch 26.

The motor 22 is connected with the gear 20 by means of the rotatable shaft 30 and a small gear wheel 32. With this arrangement it is readily seen that when the motor is operated the cam 14 will be rotated at a substantially low speed moving the end 12' of the stem up and down thereby moving the neck and head of the decoy to the positions shown in full lines at 2 and 4 and dotted lines at 2' and 4'. The end 12' of the stem 12 is held in contact with the cam 14 by the spring 13.

The cam shown in FIG. 3 may be of any desired form. Apart from raising and lowering the neck and head by the long tapered portions 14' and 14'' of the cam, the cam is provided with a rippled surface in the areas A and B as shown at 34 and 36 to give to the neck and head portion the impression of a pecking and swallowing motion. When the end 12' of the stem 12 engages the area A of the rippled portion 34 it gives the impression of pecking along the ground for food and when the stem 12 engages the area B of the rippled portion 36 of the cam it will give the impression when the head is slightly raised of a fowl swallowing the gathered food.

While the invention has been shown and described in a particular form it is not intended to be in any way a limitation as the scope of the invention is best defined in the appended claims.

I claim:

1. A decoy for wild fowl including a hollow body portion simulating a goose, including a head portion formed on one end of a neck portion wherein the opposite end of the neck portion is attached to the forward end of the body and operating means for moving the head and neck portion in a vertical plane parallel with a vertical plane passing through the body portion, the improvement comprising:
   a. said body portion having an opening adjacent its forward end adapted to hingedly receive the end of the neck opposite the head;
   b. said neck portion having an aperture therethrough adjacent the end of the neck opposite the head, the aperture being perpendicular with the vertical plane passing through the the body and neck portion;
   c. a pin extending through the aperture in the neck for supporting the same, and means associated with the body portion for supporting the ends of the pin to allow vertical movement of the neck and head members about the axis of the pin relative to the body portion;
   d. a stem rigidly fixed to the portion of the neck extending beyond the opposite side of the pin from the head supporting portion and in a vertical plane with the neck and said head;
   e. a rotatable cam adapted to rotate in a plane substantially parallel with the axis of the stem, the outer edge of the cam surface extending perpendicular to the axis of the stem and over the outer end thereof, said cam surface being such as to move the outer end of the stem in a limited arc about the neck supporting pin as the cam is rotated, thereby moving the neck and head of the decoy in a vertical plane to simulate the feeding of the fowl, and means for rotating the cam.

2. A decoy for wild fowl as claimed in claim 1 wherein the means for operating the said cam is powered by a battery and motor carried wholly within the body portion of the decoy.

3. A decoy for wild fowl as claimed in claim 1 wherein the cam surface is provided with a plurality of at least two groups of closely spaced ripples at predetermined intervals thereon.

* * * * *